United States Patent
Yoshikawa (10) Patent No.: US 7,233,358 B2
(45) Date of Patent: Jun. 19, 2007

(54) AUTOFOCUS ADAPTOR

(75) Inventor: Kazuo Yoshikawa, Saitama (JP)

(73) Assignee: Fujinon Corporation, Saitama (JP)

( * ) Notice: Subject to any disclaimer, the term of this patent is extended or adjusted under 35 U.S.C. 154(b) by 745 days.

(21) Appl. No.: 10/358,238

(22) Filed: Feb. 5, 2003

(65) Prior Publication Data
US 2003/0160888 A1    Aug. 28, 2003

(30) Foreign Application Priority Data
Feb. 26, 2002    (JP) .............................. 2002-048990

(51) Int. Cl.
*H04N 5/225* (2006.01)
*G03B 7/00* (2006.01)

(52) U.S. Cl. .................. 348/340; 348/349; 348/357

(58) Field of Classification Search .................. None
See application file for complete search history.

(56) References Cited

U.S. PATENT DOCUMENTS

| | | | | |
|---|---|---|---|---|
| 6,366,315 | B1 * | 4/2002 | Drescher | 348/207.99 |
| 6,522,480 | B2 * | 2/2003 | Nakamura | 359/698 |
| 6,822,801 | B2 * | 11/2004 | Yahagi et al. | 359/634 |
| 6,924,842 | B2 * | 8/2005 | Yahagi | 348/360 |
| 2002/0140838 | A1 * | 10/2002 | Yoshikawa | 348/345 |

FOREIGN PATENT DOCUMENTS

| | | |
|---|---|---|
| JP | S50-113228 | 9/1975 |
| JP | S55-76312  | 6/1980 |
| JP | S59-221081 | 12/1984 |
| JP | S60-222811 | 11/1985 |
| JP | S62-30224  | 2/1987 |
| JP | H1-248115  | 10/1989 |
| JP | H7-72378   | 3/1995 |
| JP | H8-50227   | 2/1996 |
| JP | H9-49965   | 2/1997 |

\* cited by examiner

*Primary Examiner*—Lin Ye
*Assistant Examiner*—Dillon Durnford-Geszvain
(74) *Attorney, Agent, or Firm*—Arnold International; Jon W. Henry; Bruce Y. Arnold (57) ABSTRACT

An autofocus adapter for detachably mounting between an imaging lens and a camera body and for detecting the focus state of the imaging lens is disclosed. The autofocus adapter includes two focus state detecting elements with light receiving surfaces slightly displaced in front and in back of a desired position of focus of the imaging lens. A beamsplitter directs some light to the two focus state detecting elements and some light through the autofocus adapter for forming an image in a camera. The autofocus adapter includes a relay lens system and electronics for detecting the focus state and controlling the focus of the imaging lens to an in-focus state based on the images detected at the two focus state detecting elements. The beamsplitter may deflect equal amounts of light to the two light receiving surfaces, and the autofocus adapter may include an iris.

8 Claims, 7 Drawing Sheets

AUTOFOCUS ADAPTOR

BACKGROUND OF THE INVENTION

The contrast method of autofocus is generally used in home camcorders. In the contrast method, higher frequency components of image signals within a certain range (focus area) among the image signals (luminance signals) that have been obtained from an image detecting element are integrated in order to obtain a focus evaluation value. Focus adjustment is then automatically performed by moving an imaging lens by maximizing the focus evaluation value. In this manner, the best focus position (i.e., the in-focus position) of an imaging lens, that is, the position that provides the sharpest (i.e., highest) contrast of an image formed by the imaging lens, can be obtained. However, the contrast method searches for the best focus position while moving focusing lens elements in what is called a hill-climbing mode, which has the disadvantage of providing a slow rate of focusing.

In order to provide faster focusing, autofocus systems and methods wherein the current focus state (front focus, back focus and in-focus) of an imaging lens is detected in order to control the focusing by using multiple image detecting elements with different optical path lengths have been proposed in order to resolve the drawback of the slow rate of focusing in the contrast method. These autofocus systems detect the focus state at the image detecting plane where an image detecting element for image production is located, and they control the focus by positioning a pair of focus state detecting elements equidistant in front of, and in back of, positions that are conjugate to the light receiving surface of the image detecting element for image production. The pair of focus state detecting elements provide quantitative focus evaluation values indicative of the focus state at each of the pair of focus state detecting elements. A comparison of the magnitude of those focus evaluation values provides information about the focus state at the light receiving surface of the image detecting element for image production. However, conventional autofocus systems have the drawback that, if the deviation from the in-focus position is too large, the difference in the focus evaluation values obtained from the pair of focus state detecting elements disappears, resulting in the focus state not being detected. Of course, this prevents fast focusing of the imaging lens to the in-focus position from being achieved.

Recently, as high-definition broadcasts have become generally available, the performance requirements of imaging lenses and cameras that are used for these camera systems have become very high. On the other hand, in the actual use of such imaging lenses and cameras, a cameraman adjusts the focus by relying upon his naked eye with reference to an image in a viewfinder, and the resolution in the viewfinder and the resolution of the image viewed in the viewfinder by the naked eye have limitations. Therefore, it is difficult for a cameraman to determine the in-focus position. Even when the cameraman believes that an in-focus image has been recorded, it is not unusual to discover that the image is not in-focus when the recorded image is played back on a large screen monitor. Therefore, the need for an autofocus system that can accurately and reliably detect the in-focus state, which state cannot accurately and reliably be detected by manual focusing using a viewfinder, keeps increasing.

However, a conventional broadcasting camera does not generally include an internal autofocus system, nor are autofocus systems always preferably used in all broadcasting cameras in all situations. In fact, it is not practical to include an autofocus system in all cameras. Therefore, many cameras now do not include, and many cameras of the future will not include, an autofocus system, even though those cameras are and will be used in many situations where use of an autofocus system would be advantageous.

BRIEF SUMMARY OF THE INVENTION

The present invention relates to an autofocus adaptor (also spelled 'autofocus adater') that can be easily combined with an existing camera system in order to enable autofocusing of an imaging lens of the camera system. According to the present invention, even though an existing camera system does not have any autofocus function, mounting an autofocus adapter of the present invention between an imaging lens and a camera body enables autofocus operation of the camera system. The autofocus adapter of the present invention includes a relay optical system so that, even though an autofocus adapter of the present invention is interposed between the imaging lens and the camera body, the in-focus position of an image on an image detecting element for image reproduction in the camera does not shift from the in-focus position that would occur if the imaging lens with the same focus setting were directly mounted onto the camera. When an autofocus adapter of the present invention is not interposed between the imaging lens and the camera body, or is removed from between the imaging lens and the camera body and the imaging lens is mounted directly on the camera body, normal operation of the camera may be performed.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION OF THE INVENTION

Two preferred embodiments of the autofocus system of the present invention will now be individually described with further reference to the attached drawings.

EMBODIMENT 1

Figure 1A:
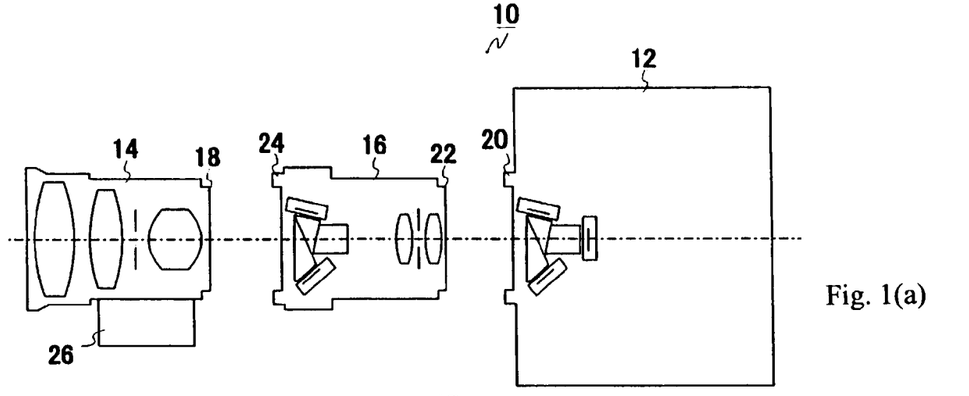
FIGS. 1(a)–1(c) show cross-sectional views of a camera and imaging lens variously with and without the autofocus adapter of Embodiment 1 of the present invention in order to show how an autofocus adapter of the present invention may be attached to a camera.
Figure 1B:
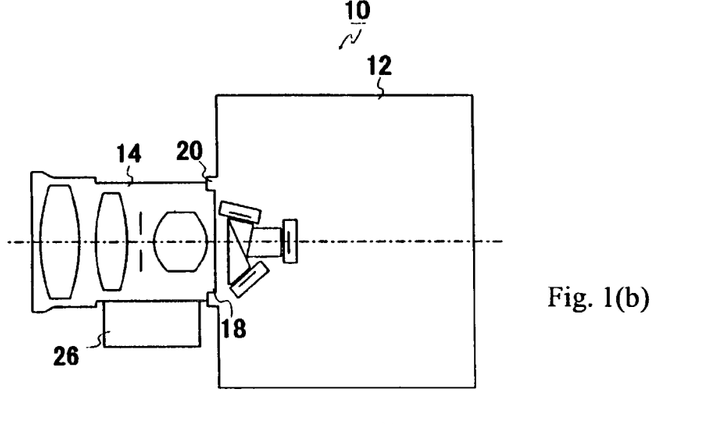
Figure 1C:
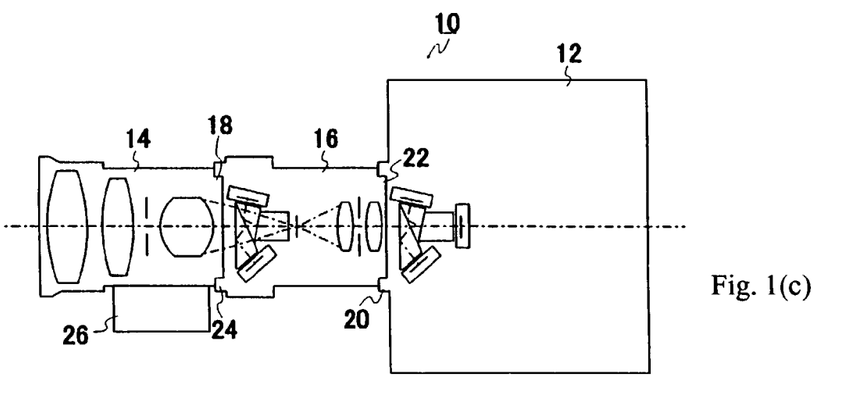

FIGS. 1(a)–1(c) show cross-sectional views of a camera and imaging lens variously with and without the autofocus adapter of Embodiment 1 of the present invention in order to illustrate how an autofocus adapter of the present invention may be attached to a camera. As shown in FIG. 1(a), the camera system 10 is provided with a camera body 12, an imaging lens 14, and an autofocus adapter (hereinafter 'AF adapter') 16. The AF adapter is designed to be mountable on the camera at the option of a cameraman. When the AF adapter 16 is mounted on the camera, the AF adapter 16 is interposed between the imaging lens 14 and the camera body 12, as shown in FIG. 1(a), and the imaging lens 14, AF adapter 16, and camera body 12 are secured together, as shown in FIG. 1(c). When an AF function is not required, the AF adapter 16 is not used and the imaging lens 14 is directly secured to the camera body, as shown in FIG. 1(b).

As shown in FIG. 1(b), an imaging lens mount 18 is formed at the image side of the imaging lens 14 for connection to a camera mount 20 at the object side of the camera body 12 in order to secure the imaging lens 14 to the camera body 12. Further, as shown in FIGS. 1(a) and 1(c), a rear AF mount 22, which has the same configuration as the imaging lens mount 18, is formed at the image side of the AF adapter 16, and the rear AF mount 22 may be connected to the camera mount 20 in order to secure the AF adapter 16 to the camera body 12. Similarly, a front AF mount 24, which has the same configuration as the camera mount 20, is formed at the object side of the AF adapter 16, and the front AF mount 24 may be connected to the imaging lens mount 18 in order to secure the AF adapter 16 to the imaging lens 14.

As shown in FIGS. 1(a)–1(c), the imaging lens 14 includes a drive unit 26 that may be electrically connected to the AF adapter 16 by a cable (not shown). The drive unit 26 generally drives a focusing lens, zoom lens components, and an iris (all of which are arranged within the imaging lens 14), and the AF adapter 16 provides control signals to the drive unit 26 during autofocus control (hereinafter 'AF control') so as to focus upon an object.

Figure 2:
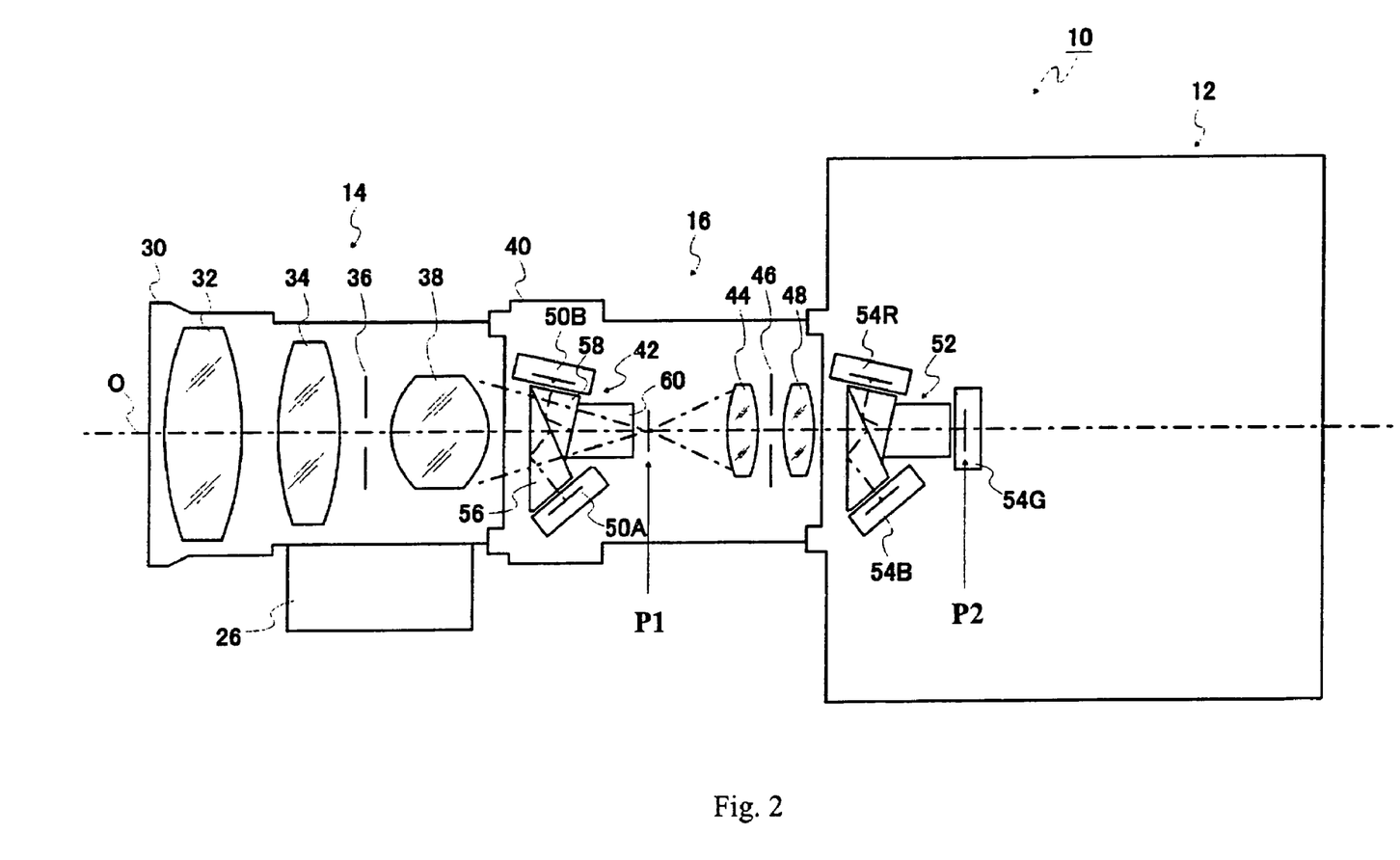
FIG. 2 shows an enlarged cross-sectional view of the camera, imaging lens, and autofocus adapter of FIG. 1(c)

FIG. 2 shows an enlarged cross-sectional view of the camera body 12, imaging lens 14, and autofocus adapter 16 of FIG. 1(c). In FIG. 2, the construction of each lens is simplified, with lens groups that include multiple lenses being shown as single lenses. As shown in FIG. 2, a focusing lens 32, a zoom lens 34, an iris 36, and an imaging lens relay lens 38, in that order from the object side, are arranged within a lens barrel 30 of the imaging lens 14. The object light that has entered from the object side of the imaging lens 14 passes through each of these lenses and is emitted from the image side of the imaging lens 14.

A beamsplitter 42, a first relay lens component 44, a second iris 46, and a second relay lens component 48, in that order from the object side of the AF adapter 16, are arranged along an optical axis, defined by the relay lens system that includes first and second relay lens components 44 and 48, within a case 40 of the AF adapter 16. The AF adapter is constructed so that the optical axis defined by the relay lens system coincides with the optical axis O of the imaging lens 14 when the AF adapter 16 is secured to the imaging lens 14.

The light emitted from the image side of the imaging lens 14 and entering the object side of the AF adapter 16 is divided by the beamsplitter 42 into three light beams, one for image production and two for focus state detection. The light beam for image production travels along the optical axis O of the imaging lens 14, passes through the first relay lens component 44, the second iris 46, the second relay lens component 48, and is emitted from the image side of the AF adapter 16. On the other hand, the two light beams for focus detection are deflected along separate optical axes and are incident separately onto a light receiving surface of a first focus state detecting element 50A and onto a light receiving surface of a second focus state detecting element 50B. The beamsplitter 42 including the first and second focus state detecting elements 50A and 50B are in a front portion that is near the object side of the AF adapter 16, and the first relay lens component 44, the second iris 46, and the second relay lens component 48 are in a rear portion that is near the image side of the AF adapter 16.

When the AF adapter 16 is mounted between the camera body 12 and the imaging lens 14, the second iris 46 that is positioned within the AF adapter 16 functions as a diaphragm, and the iris 36 that is arranged within the imaging lens 14 assumes an open position so that the function of iris 36 is suspended. The second iris 46 is driven by an iris motor (not shown) and is controlled based upon control signals that are provided from the camera body 12, or are based upon information related to direct manual operation.

A color separation prism 52 is arranged along the optical axis O of the imaging lens 14 within the camera body 12, and the object light for image production that has been emitted from the image side of the AF adapter 16 is separated into different color light beams, R (red), G (green) and B (blue), by the color separation prism 52. Then, the different color light beams, R, G, and B, strike the image detecting element elements for image production 54R, 54G and 54B, respectively, and are converted into electrical signals by the image detecting element elements for image production 54R, 54G and 54B. Then, the signals are processed by conventional image signal processing systems and are transmitted as image signals with a designated format or recorded onto a recording medium.

Figure 3:
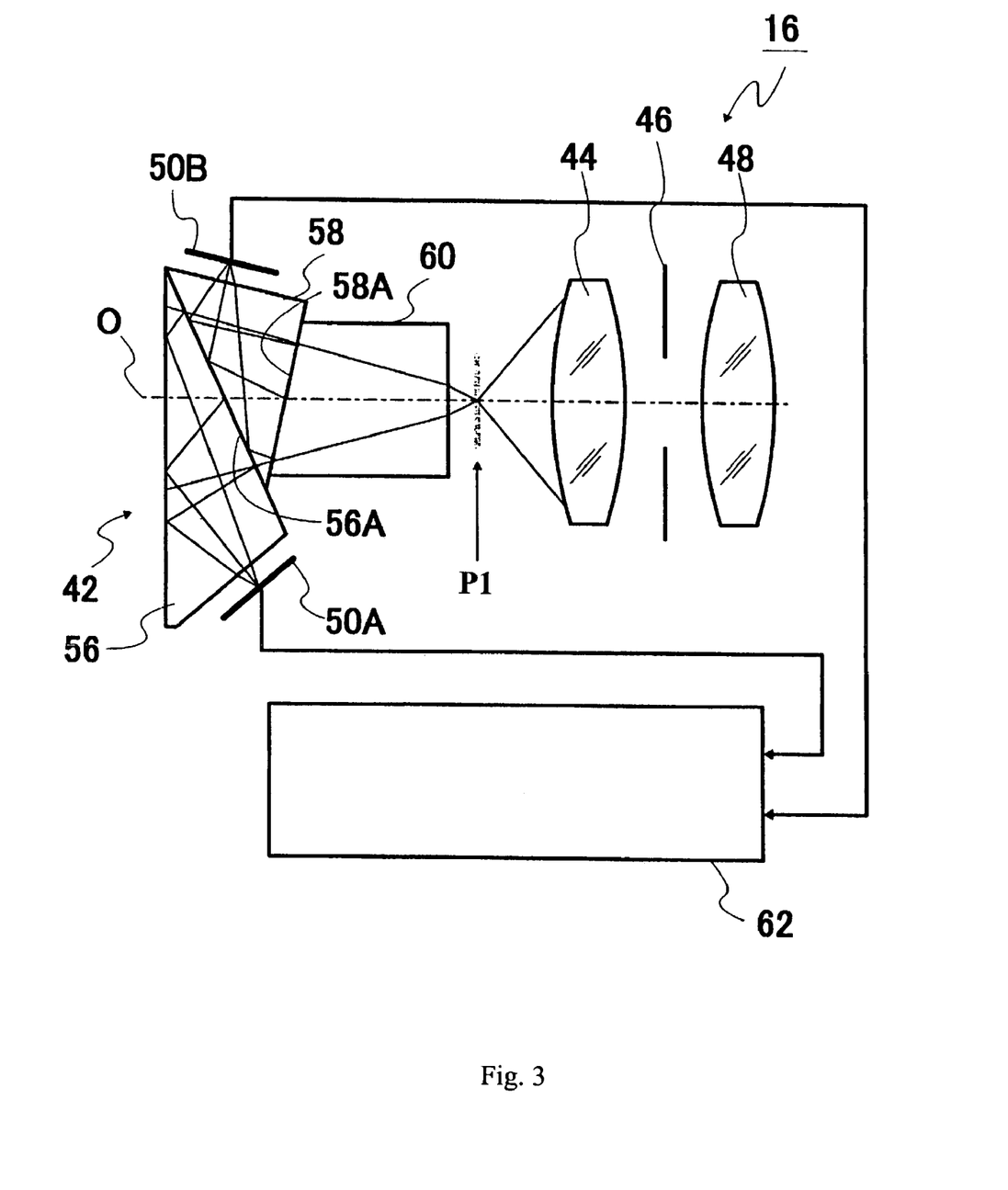
FIG. 3 shows a further enlarged cross-sectional view of the autofocus adapter of FIG. 2, with electrical connections to a signal processor shown.

FIG. 3 shows a further enlarged cross-sectional view of the autofocus adapter 16 shown in FIG. 2 with electrical connections to a signal processor 62 shown. As shown in FIG. 3, the beamsplitter 42 includes three prisms 56, 58 and 60, and is formed with the same configuration as the color separation prism 52. The object light that has been emitted from the image side of the imaging lens 14 enters the first prism 56 and is divided by a partially reflecting surface 56A of the first prism into a reflected light beam and a transmitted light beam. The light reflected at the partially reflecting surface 56A is reflected to the first focus state detecting element 50A. The light beam transmitted at the partially reflecting surface 56A then enters the second prism 58.

The light beam that enters the second prism 58 is divided by a partially reflecting surface 58A of the second prism into a reflected light beam and a transmitted light beam. The light reflected at the partially reflecting surface 58A is reflected to the second focus state detecting element 50B. The light beam transmitted at the partially reflecting surface 58A then enters the third prism 60. The light beam that enters the third prism 60 is transmitted through the third prism 60 and enters the first relay lens component 44 as object light for image production.

As explained above, the beamsplitter 42 divides the object light that has passed through the imaging lens 14 into the two light beams, one for focus state detection and one for image production. Preferably, the beamsplitter 42 divides the object light so as to equalize the amount of light that enters each of the first and second focus state detecting elements 50A and 50B. Additionally, preferably, the beamsplitter 42 divides the object light so that the amount of object light directed through the beamsplitter 42 toward the relay lens 44 is twice that directed toward the first and second focus state detecting elements 50A and 50B, taken together. That is, preferably, the amount of light intended to be used for image production is in the ratio of 2:1 to the object light to be used for focus detection. Therefore, preferably, one-sixth of the object light that has passed through the imaging lens 14 is incident onto each of the first and second focus state detecting elements 50A and 50B, and the remaining two-thirds of the object light that has passed through the imaging lens 14 is directed toward the imaging elements for image production 54R, 54G and 54B in the camera body 12 (FIG. 2) for use in producing or recording an image. Further, it is not necessary that the first and second focus state detecting elements 50A and 50B detect different color images, and, therefore, charge coupled devices (CCDs) that are used in producing black and white images may be used as the first and second focus state detecting elements 50A and 50B.

As shown in FIG. 2, the object light for image production that passes through the beam splitter 42 forms a first image of the object at a first image plane P1, which is separated from the image side of the imaging lens 14 at a designated distance, when the object is in focus. The relay optical system that includes the first relay lens component 44 and the second relay lens component 48 converges the object light for image production and forms a second image of the object on a second image plane P2. The second image plane P2 is separated from the image side of the AF adapter 16 the same distance as the first image plane P1 is separated from the object side of the AF adapter 16. A light receiving surface of the image detecting element for image production 54G is arranged on the second image plane P2. Thus, images which are the same as the image of the object formed on the first image plane P1 are formed on the light receiving surfaces of the image detecting elements for image production 54R, 54G, and 54B. The first image plane P1 is in a conjugate position with respect to the image planes of the light receiving surfaces of the image detecting element elements for image production 54R, 54G, and 54B, such as second image plane P2, so that the same image is formed on the light receiving surfaces of the image detecting element elements for image production 54R, 54G and 54B whether or not the AF adapter 16 is mounted between the imaging lens 14 and the camera body 12, as shown in FIG. 2, or the imaging lens 14 is mounted directly on the camera, as shown in FIG. 1(b).

Figure 4:
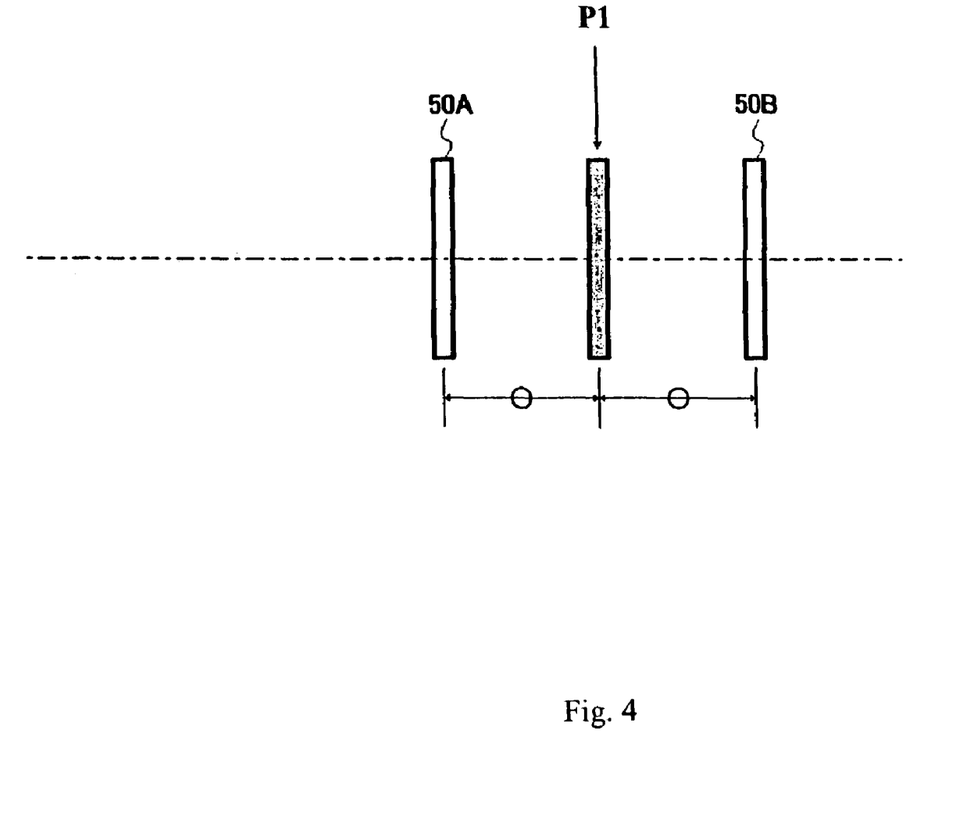
FIG. 4 shows, for purposes of explanation of operation only, a plane that is conjugate to the image detecting element for image production, and with first and second focus state detecting elements of an autofocus adaptor according to the present invention positioned on either side of the plane that is conjugate along a straight line.

FIG. 4 shows image plane P1 and the positions of the first and second focus state detecting elements 50A and 50B expressed on the same straight line representing an alignment of their optical axes for an autofocus adapter of the present invention. The optical path length of the object light received at the light receiving surface of the first focus state detecting element 50A is substantially shorter than that of the object light received at the light receiving surface of the second focus state detecting element 50B, and the first focus state detecting element 50A and the second focus state detecting element 50B are equidistant in front of, and in back of, positions that are conjugate to the position of the first image plane P1, respectively.

In terms of the autofocus adapter 16 itself, the position of the image plane P1 is the position of a real image along the optical axis that is formed by the relay lens system which includes first and second relay lens components 44 and 48 defined so that a wavefront of a light beam entering the front end of the autofocus adapter 16 and forming that real image would be converted by the relay lens system into a wavefront at the rear end of the autofocus adapter that is capable of forming a real unity magnification image of that real image without any additional focusing optics. The positions of the front end and the rear end of the autofocus adapter are precisely defined so that an image formed directly by the imaging lens 14 in the camera body 12, and by the imaging lens 14 together with the autofocus adapter 16 in the camera body 12, will be substantially the same except for inversion and reversion of the image by the autofocus adapter 16.

As mentioned above, the first image plane P1 and the light receiving surfaces of the image detecting element elements for image production 54R, 54G and 54B are also in conjugate positions. Therefore, the light receiving surfaces of the first and second focus state detecting elements 50A and 50B are at positions that are also equidistant in front of, and in back of, positions that are conjugate to the positions of the light receiving surfaces of the image detecting element elements for image production 54R, 54G and 54B.

As shown in FIG. 3, image signals from the first focus state detecting element 50A and the second focus state detecting element 50B are transmitted to a signal processor 62. As discussed below, detection of the focus state of the imaging lens 14 is based on the image signals obtained from the first and second focus state detecting elements 50A and 50B. Then, a drive signal is provided to the drive unit 26 (FIG. 2) based upon the detection results in order to control a drive motor (not shown) that moves focusing lens 32 so as to perform autofocus control of the imaging lens 14.

Figure 5:
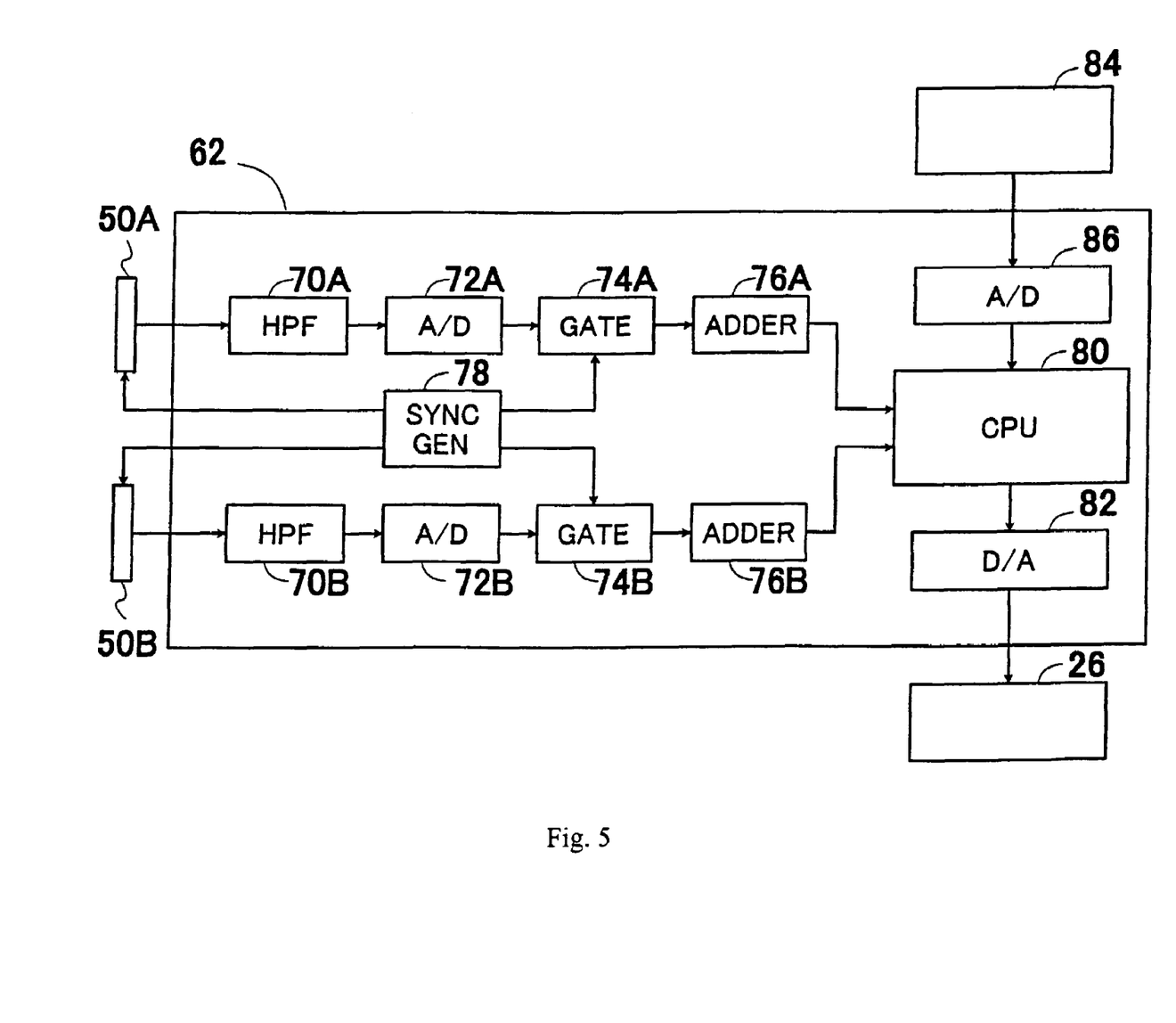
FIG. 5 is a schematic block diagram of a signal processor and elements electrically connected to it of an autofocus adapter of the present invention.

FIG. 5 is a schematic block diagram of a signal processor 62 and elements electrically connected to it of an autofocus adapter of the present invention. As shown in FIG. 5, image signals of the first and second focus state detecting elements 50A and 50B are transmitted to the signal processor 62 as video signals in a designated format. The signal processor 62 converts the video signals transmitted from each of the first and second focus state detecting elements 50A and 50B into signals that are focus evaluation values that indicate the degree of sharpness (contrast) of the images at each of the first and second focus state detecting elements 50A and 50B. The video signals transmitted from each of the first and second focus state detecting elements 50A and 50B are converted to the focus evaluation values by high-pass filters 70A and 70B, A/D converters 72A and 72B, gate circuits 74A and 74B and adders 76A and 76B. The converted signals, that is, the focus evaluation values, are entered into a CPU 80.

The process up to the point where the focus evaluation values are obtained is further explained below. Both the first and second focus state detecting elements 50A and 50B are CCDs for monochrome (i.e., black and white) detection, so that the video signals that are transmitted from each of the first and second focus state detecting elements are luminance signals that indicate the luminosity of each pixel of each focus state detecting element. In the operation of the signal processor 62, first, the high-pass filters 70A and 70B extract the high frequency components from the video signals that have been transmitted from each of the first and second focus state detecting elements 50A and 50B. These components are converted into digital signals by the A/D converters 72A and 72B. Then, only the digital signals corresponding to pixels within a designated focus area are extracted from these digital signals by the gate circuits 74A and 74B, and the values of the extracted digital signals are added by the adders 76A and 76B. Consequently, the sum of the values of the high frequency components in the video signals within each designated focus area for each of the first and second focus state detecting elements 50A and 50B is obtained. Each sum is the focus evaluation value that indicates the degree of sharpness of the image within each designated focus area.

Furthermore, various synchronized signals are provided to each of the first and second focus state detecting elements 50A and 50B and to each circuit, such as the gate circuits 74A and 74B, from a sync-generator 78, shown in FIG. 5, with the processing performed by each circuit being designed to be synchronized. Further, a vertical synchronized signal(s) (V signal) per field of video signals is provided to the CPU 80 from the sync-generator 78. The CPU 80 detects the current focus conditions of the imaging lens 14 for the light receiving surfaces of the image detecting element elements for image production 54R, 54G, and 54B based on the focus evaluation values obtained from the first and second focus state detecting elements 50A and 50B.

Figure 6:
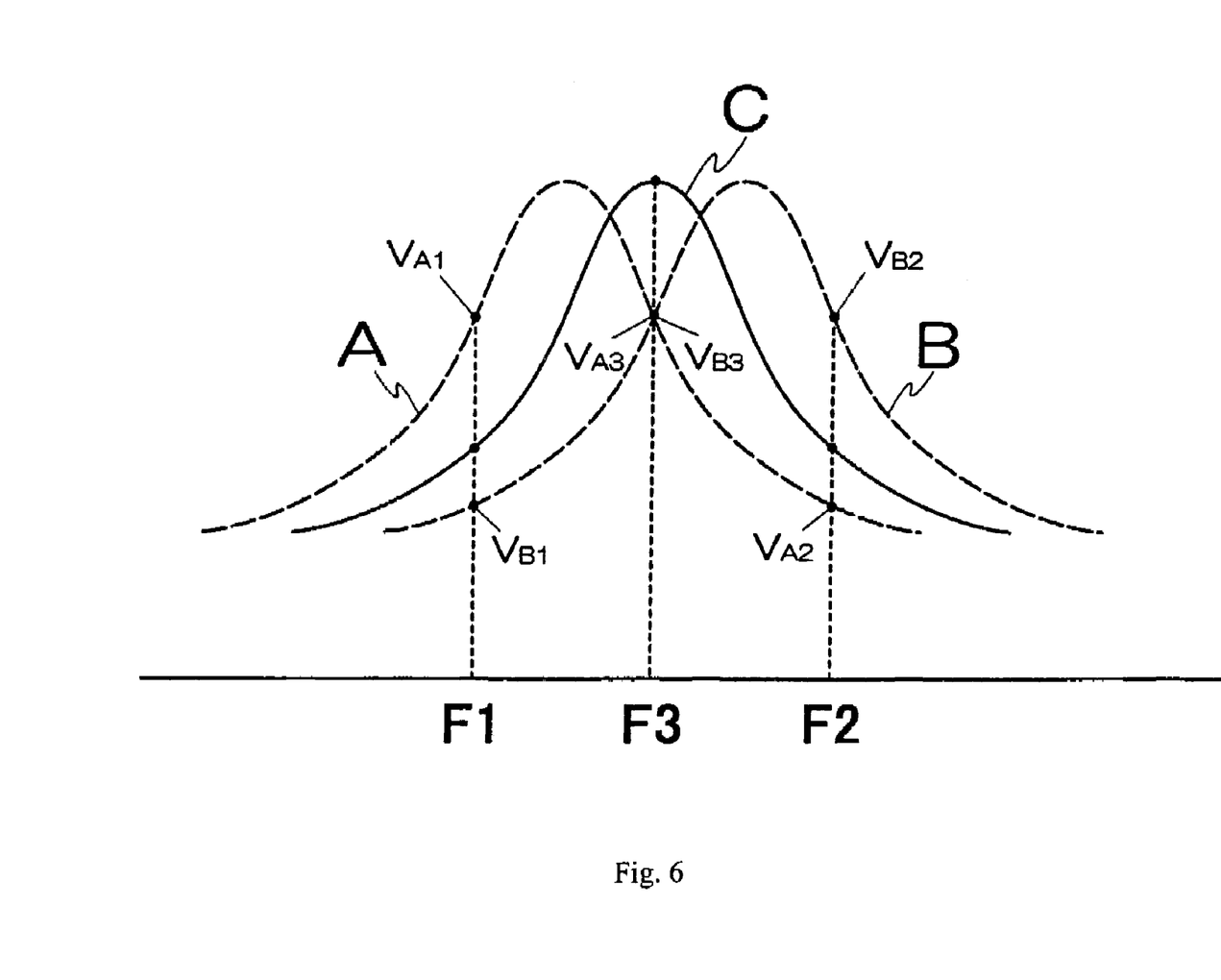
FIG. 6 shows focus evaluation values plotted against focus position during focus detection of an image of an object, with the focus positions being shown along the horizontal axis and the focus evaluation values shown along the vertical axis for an autofocus adapter of the present invention.

Next, the detection method for the focus state based upon the focus evaluation values obtained from the first and second focus state detecting elements 50A and 50B will be explained. FIG. 6 shows focus evaluation values plotted against focus position during focus detection of an image of an object with the focus positions along the X-axis and the focus evaluation values along the Y-axis for an autofocus adapter of the present invention. The curve C, indicated by a solid line in FIG. 6 and centered at a position F3, shows the focus evaluation values that would be associated with an image detecting element for image production. The position F3, with the maximum focus evaluation value of the curve C, is the position of best focus, that is, the in-focus position, where the image detecting element elements for image production are desirably located. Curves A and B, indicated by dashed lines, show the focus evaluation values obtained from the focus state detecting elements 50A and 50B, respectively, at different focus positions.

When the focus position of the imaging lens 14 is F1, the focus evaluation value obtained from the first focus state detecting element 50A is the value $V_{A1}$ on the curve A, as shown in FIG. 6. On the other hand, the focus evaluation value obtained from the second focus state detecting element 50B is the value $V_{B1}$ on the curve B, as shown in FIG. 6. The value $V_{B1}$ is smaller than the value $V_{A1}$. Therefore, when the focus evaluation value $V_{A1}$ obtained from the first focus state detecting element 50A, is greater than the focus evaluation value $V_{B1}$, obtained from the second focus state detecting element, it is understood that the position of focus of the imaging lens 14 is closer than the in-focus position F3, that is, the imaging lens 14 is in a position of front focus.

On the other hand, when the focus position of the imaging lens 14 is F2, the focus evaluation value obtained from the first focus state detecting element 50A is the value $V_{A2}$ on the curve A, as shown in FIG. 6, and the focus evaluation value obtained from the second focus state detecting element 50B is the value $V_{B2}$ on the curve B, as shown in FIG. 6. In this case, the focus evaluation value $V_{A2}$, obtained from the first focus state detecting element 50A is smaller than the focus evaluation value $V_{B2}$, obtained from the second focus state detecting element 50B. Therefore, when the focus evaluation value $V_{A2}$, obtained from the first focus state detecting element 50A, is smaller than the focus evaluation value $V_{B2}$, obtained from the second focus state detecting element 50B, it is understood that the position of focus of the imaging lens 14 is farther than the in-focus position F3, that is, the imaging lens 14 is in a position of back focus.

In contrast, when the focus position of the imaging lens 14 is F3, in other words, in the in-focus position, the focus evaluation value obtained from the first focus state detecting element 50A is the value $V_{A3}$ on the curve A, as shown in FIG. 6, and the focus evaluation value that is obtained from the second focus state detecting element 50B is the value $V_{B3}$ on the curve B, as shown in FIG. 6. In this case, the focus evaluation values $V_{A3}$ and $V_{B3}$ are equal. Therefore, when the focus evaluation value that is obtained from the first focus state detecting element 50A and the focus evaluation value obtained from the second focus state detecting element 50B are equal, it is understood that the position of focus of the imaging lens 14 is at the in-focus position F3. The in-focus position is where the imaging lens is focused so as to form a real image in the autofocus adapter with the optical path length to this real image being halfway between the optical path length along a separate optical axis to the light receiving surface of the first focus state detecting element and the optical path length along a separate optical axis to the light receiving surface of the second focus state detecting element.

Consequently, as explained above, if the focus evaluation values $V_A$ and $V_B$, that are obtained from the first and second focus state detecting elements 50A and 50B, respectively, are identified, it can be determined whether the current focus state of the imaging lens 14 is front focus, back focus, or in-focus.

The CPU 80 calculates the moving speed or moving distance in order to guide the focusing lens 32 to the in-focus position based upon the detection results and the current position information for the focusing lens 32, and provides the control signal for the focus motor to the drive unit 26 via a D/A converter 82. The drive unit 26 drives the focus motor based upon the control signal and moves the focusing lens 32 to the in-focus position. Furthermore, the position of the focusing lens 32 is detected by a focusing lens position detector 84, and the detected position information is transferred from the focusing lens position detector 84 to the CPU 80 via an A/D converter 86.

The operation of the camera system 10 of Embodiment 1 of the present invention, which is constructed as explained above, is as follows. In the case of imaging without using the AF adapter, the imaging lens 14 is directly mounted onto the camera body 12, as shown in FIG. 1(b). On the other hand, in the case of imaging by using the AF adapter, as shown in FIG. 1(c), the AF adapter 16 is mounted between the imaging lens 14 and the camera body 12, and the AF adapter 16 is connected with the drive unit 26 via a cable (not shown).

Once the AF adapter 16 is mounted, the iris 36 in the imaging lens 14 is in an open state, and its function is suspended. Diaphragm control is performed by the second iris 46, which is arranged in the AF adapter 16. Further, when the AF adapter 16 is mounted, images in front of, and in back of, the image detecting element elements for image production 54R, 54G and 54B are detected by the first focus state detecting element 50A and the second focus state detecting element 50B, and the focus state of the imaging lens 14 is determined by the signal processor 62 based upon image data from the images detected by the first and second focus state detecting elements 50A and 50B. Then, the imaging lens 14 is controlled by comparing the focus evaluation values determined from the image data obtained from the first and second focus state detecting elements 50A and 50B.

As explained above, according to the camera system 10 of the present invention, an autofocus function can be simply added to an existing camera system by mounting the AF adapter 16. As also explained above, the AF adapter 16 of Embodiment 1 of the present invention includes a relay optical system, so that the position of focus in the camera body 12 remains the same whether the imaging lens 14 is directly mounted on the camera body or the AF adapter 16 is mounted between the imaging lens 14 and the camera body 12.

Further, as explained above, the AF adapter 16 of the present invention is equipped with the second iris 46 behind the beamsplitter 42, and when the AF adapter 16 is mounted on the camera body 12, diaphragm control is performed by the second iris 46, so that depth of focus is not affected by using the AF adapter 16. Alternatively, diaphragm control can be performed by the iris 36, which is arranged in the imaging lens 14, as usual, without installing the second iris 46.

The AF adapter 16 of the present invention uses only two focus state detecting elements 50A and 50B so that it may allow more light to be passed to the image detecting element elements for image production than if three focus state detecting elements were used. Furthermore, although preferably the AF adapter 16 of the present invention is designed so that the total amount of light passed to the image detecting element elements for image production is twice the total amount of light passed to the focus state detecting elements 50A and 50B, the present invention is not limited to that division of light. For example, the amount of light directed toward each of the focus state detecting elements might be made equal to the amount of light directed toward the image detecting element elements for image production.

Further, although in Embodiment 1 the beamsplitter 42 uses prisms with the same shape and configuration as corresponding prisms of the color separation prism 52 arranged in the camera body 12, the invention is not limited to such similarities. In that regard, Embodiment 2 of the present invention is explained below.

EMBODIMENT 2

Figure 7:
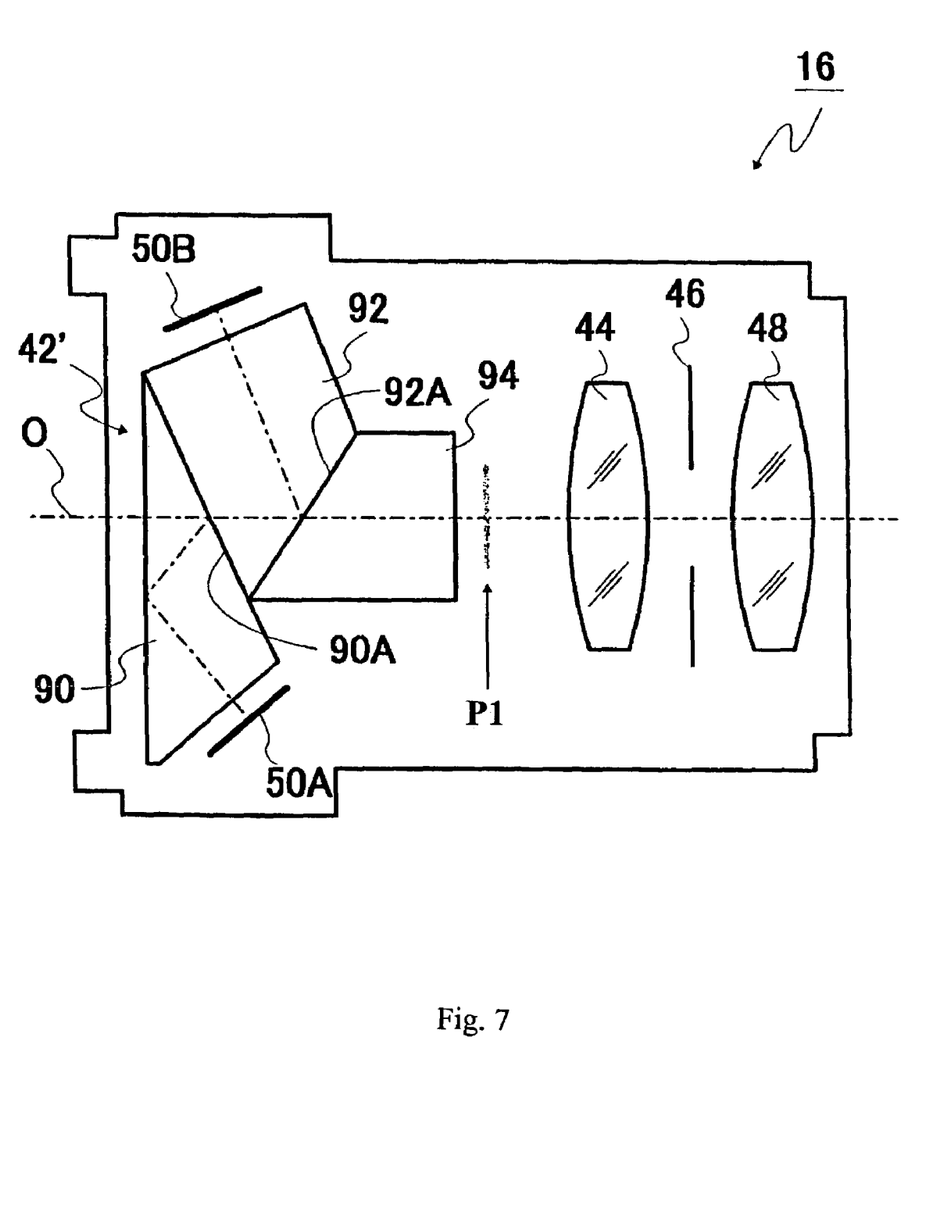
FIG. 7 shows a cross-sectional view of Embodiment 2 of an autofocus adapter of the present invention.

Embodiment 2 of the present invention will be described with reference to FIG. 7. Because Embodiment 2 is similar to Embodiment 1, primarily only differences between Embodiment 2 and Embodiment 1 will be explained for Embodiment 2. Embodiment 2 is the same as Embodiment 1 of the present invention except that the beamsplitter 42 is replaced with beamsplitter 42' having a different construction than the beamsplitter 42 of Embodiment 1. As shown in FIG. 7, beamsplitter 42' includes three prisms 90, 92 and 94, and the object light that has been emitted from the image side of the imaging lens 14 first enters into the first prism 90. Then, the object light is divided into reflected light and transmitted light by a partially reflecting mirror surface 90A of the first prism 90. The reflected light is incident on the first focus state detecting element 50A as the first object light for focus state detection, and the transmitted light enters into the second prism 92. Transmitted light that has entered into the second prism 92 is additionally divided into reflected light and transmitted light by a partially reflecting mirror surface 92A of the second prism 92. The reflected light is incident on the second focus state detecting element 50B as second object light for focus state detection, and the transmitted light enters into the third prism 94. Then, the transmitted light that has entered into the third prism 94 enters into the first relay lens component 44 as object light for transmission to image detecting element elements for image production. In Embodiment 2, the image that is formed on the second focus state detecting element 50B is reversed because the light undergoes only one reflection, unlike Embodiment 1 where the light to both focus state detecting elements 50A and 50B is twice reflected. However, to provide image data like that of Embodiment 1 with identical, rather than reversed, images at the two focus state detecting elements 50A and 50B, the signal processor 62 may be adapted by well known techniques to perform electronic operations equivalent to an optical reversal of one of the images in terms of the data produced, thus avoiding any problems associated with reversed images being detected by the two focus state detecting elements 50A and 50B.

The present invention is not limited to the aforementioned embodiments, as it will be obvious that various alternative implementations are possible. For instance, the present invention may be used with all types of camera systems that include a camera body and a replaceable imaging lens, including video cameras or similar cameras, still cameras that take static or single frame images, moving picture cameras, and including television cameras and photographic cameras. Additionally, the present invention is not restricted to the object beam for focus state detection being split into two light beams by three prisms as a light dividing optical system for projecting onto the two focus state detecting elements. For example, prism 60 of Embodiment 1 or prism 94 of Embodiment 2 may be omitted. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An autofocus adaptor for detachably mounting between an imaging lens and a camera body and for detecting the focus state of the imaging lens, the autofocus adaptor including an object side and an image side and comprising:

two focus state detecting elements, each focus state detecting element including a light receiving surface;

light dividing means for dividing light that enters the object side of the autofocus adaptor in order to direct some of the light toward the light receiving surfaces of the two focus state detecting elements and to direct some of the light toward the rear of the autofocus adaptor;

a relay lens system that receives the light that the light dividing means directs toward the rear of the autofocus adaptor, wherein the relay lens system defines an optical axis of the autofocus adaptor and the light dividing means deflects light toward each said light receiving surface along a separate optical axis;

focus state detection means for detecting, when an imaging lens is attached to the autofocus adaptor, the focus state of an imaging lens based on images received at the light receiving surfaces of said two focus state detecting elements; and control means for controlling, when the autofocus adaptor is detachably mounted to an imaging lens, the focus of the imaging lens based on the focus state detected by the focus state detection means, and further comprising:

an iris that receives light that is directed toward the rear of the autofocus adaptor from the light dividing means.

2. The autofocus adaptor of claim 1, wherein the optical path length along one said separate optical axis to one said light receiving surface is substantially shorter than the optical path length along the other said separate optical axis to the other said light receiving surface.

3. The autofocus adaptor of claim 2, wherein the light dividing means directs substantially the same amount of light toward each said light receiving surface.

4. The autofocus adaptor of claim 2, wherein a position along said first optical axis exists where a real image defined so that a wavefront of a light beam entering the front end of the autofocus adaptor and forming that real image would be converted by the relay lens system into a wavefront at the rear end of the autofocus adaptor that is capable of forming a real unity magnification image of that real image without any additional focusing optics, and an optical path length to said position along said first optical axis is halfway between said optical path length along one said separate optical axis to one said light receiving surface and said optical path length along the other said separate optical axis to the other said light receiving surface.

5. The autofocus adaptor of claim 4, wherein the light dividing means directs substantially the same amount of light toward each said light receiving surface.

6. The autofocus adaptor of claim 1, wherein the light dividing means directs substantially the same amount of light toward each said light receiving surface.

7. An autofocus adaptor for detachably mounting between an imaging lens and a camera body and for detecting the focus state of the imaging lens, the autofocus adaptor including an object side and an image side and comprising:

two focus state detecting elements, each focus state detecting element including a light receiving surface;

light dividing means for dividing light that enters the object side of the autofocus adaptor in order to direct some of the light toward the light receiving surfaces of the two focus state detecting elements and to direct some of the light toward the rear of the autofocus adaptor;

a relay lens system that receives the light that the light dividing means directs toward the rear of the autofocus adaptor, wherein the relay lens system defines an optical axis of the autofocus adaptor and the light dividing means deflects light toward each said light receiving surface along a separate optical axis;

focus state detection means for detecting, when an imaging lens is attached to the autofocus adaptor, the focus state of an imaging lens based on images received at the light receiving surfaces of said two focus state detecting elements; and control means for controlling, when the autofocus adaptor is detachably mounted to an imaging lens, the focus of the imaging lens based on the focus state detected by the focus state detection means;

wherein the optical path length along one said separate optical axis to one said light receiving surface is substantially shorter than the optical path length along the other said separate optical axis to the other said light receiving surface; and a position along said first optical axis exists where a real image defined so that a wavefront of a light beam entering the front end of the autofocus adaptor and forming that real image would be converted by the relay lens system into a wavefront at the rear end of the autofocus adaptor that is capable of forming a real unity magnification image of that real image without any additional focusing optics, and an optical path length to said position along said first optical axis is halfway between said optical path length along one said separate optical axis to one said light receiving surface and said optical path length along the other said separate optical axis to the other said light receiving surface.

8. The autofocus adaptor of claim 7, wherein the light dividing means directs substantially the same amount of light toward each said light receiving surface.

* * * * *